United States Patent

Bartlett et al.

[15] 3,639,693

[45] Feb. 1, 1972

[54] TIME DIVISION MULTIPLEX DATA SWITCH

[72] Inventors: William F. Bartlett, Rochester; William A. Oswald, Brighton, both of N.Y.

[73] Assignee: Stromberg-Carlson Corporation, Rochester, N.Y.

[22] Filed: Nov. 22, 1968

[21] Appl. No.: 784,991

[52] U.S. Cl. .......... 179/15 AT

[51] Int. Cl. .......... H04j 3/00

[58] Field of Search .......... 179/15 AT, 15 BV, 15 BW, 15 AT, 179/15 BA, 15 BS

[56] References Cited

UNITED STATES PATENTS

| | | | |
|---|---|---|---|
| 3,261,001 | 7/1966 | Magnin | 179/15 BA |
| 3,433,899 | 3/1969 | Pfleiderer et al. | 179/15 AN |
| 3,458,659 | 7/1969 | Sternung | 179/15 AQ |
| 3,263,030 | 7/1966 | Stiefel et al. | 179/15 AT |
| 3,288,928 | 11/1966 | Bartlett et al. | 179/15 BW |
| 3,439,124 | 4/1969 | Dupieux et al. | 179/15 AT |

*Primary Examiner*—Kathleen H. Claffy
*Assistant Examiner*—David L. Stewart
*Attorney*—Craig, Antonelli & Hill

[57] ABSTRACT

A time division multiplex data switch wherein any one of a plurality of input channels forming a plurality of input groups may be switched to any one of a plurality of output channels forming a plurality of output groups, which includes individually synchronized bit distributors associated with each input group, for distributing the bits to a plurality of single-bit stores, each associated with a channel, and a single-time division highway controlled by a dynamic memory.

12 Claims, 7 Drawing Figures

INVENTORS
WILLIAM F. BARTLETT
WILLIAM A. OSWALD

BY Craig & Antonelli
ATTORNEYS

TIME DIVISION MULTIPLEX DATA SWITCH

The present invention relates to time division multiplex multichannel communication systems and more particularly to the switching of information in telecommunication transmission systems.

A requirement of multichannel telecommunication transmission systems is that any one of a number of incoming channels of the system, which may form a plurality of input groups, must be switchable to any number of outgoing channels making up respective output groups; but, as in general, since the incoming and outgoing channels are not necessarily in time coincidence, storage and switching of channel information is necessary. In addition, since the groups containing the incoming and outgoing channels may provide different bit rates, special timing problems are often encountered in these systems.

The present invention provides a time division multiplex data switching arrangement which accomplishes switching between a plurality of input channels or submultiplex channels and a plurality of output channels or submultiplex channels, operating to effectively switch any input channel or submultiplex channel to any output channel or submultiplex channel regardless of the bit rate of the group to which either channel or submultiplex channel is assigned. Thus, interchannel switching and bit rate adjustment are accomplished in a relatively simple manner.

The switching arrangement disclosed herein basically contains a plurality of input and output buffers and a single time division highway controlled by a dynamic memory. Inputs to the basic switching arrangement consist of individual channels or groups of channels where the information per group is bit multiplexed at a prescribed rate. Varying numbers of channels can be assigned to any group with the input bit rate to a node via a group depending on the number of channels assigned thereto. The input and output groups to and from a node can be individually assigned any combination of channels or submultiplex channel quantities such that the total quantity of channels in all groups switched by the node does not exceed a prescribed value determined by the cross-office switching frame. Thus, an input channel or submultiplex channel forming part of a group of N channels or submultiplex channels may be switched to an output channel or submultiplex channel forming part of a group including M output channels or submultiplex channels, where M is greater or less than N, thereby providing for automatic bit rate adjustment along with interchannel switching.

In telephone systems, circuit switching demands two basic applications for switching nodes, one oriented toward trunk switching (termed a trunk switching group) and the other oriented toward local subscribers (termed a loop switching group). However, each application requires most functions of the other, the major difference being in emphasis. Therefore, one basic switch design is disclosed herein, it being understood that obvious variations in optional pluggable units may be provided which orient the switch toward the trunk or loop switching group. The supervision, control and status of trunk groups is accomplished by out of band signalling information which is contained in a predetermined channel associated with each trunk group.

The invention is characterized by the provision of an input bit distributor which provides for a demultiplexing of the data received on each incoming channel or submultiplex channel providing single-bit buffers for storage of the distributed bits for a time equal to the frame time or repetition time of the received channels or submultiplex channels.

A dynamic memory is provided in accordance with another feature of the invention for switching data from the input buffers with each time slot of the memory being assigned to a particular output channel or submultiplex channel. The recording of a particular input buffer in a time slot assigned to a particular output channel or submultiplex channel derived from the out-of-band signalling information thereby provides for a switching of the data in the particular input buffer to the designated output channel or submultiplex channel in the desired time slot of the switching time frame.

A particularly advantageous feature of the present invention relates to the ability to handle both channels and submultiplex channels at the same time.

Where both channels and submultiplex channels are provided at the input and output of the data switch, it is possible in accordance with the present invention to switch a combination of input channels and submultiplex channels to a combination of output channels and submultiplex channels. A novel control arrangement is provided in accordance with the present invention whereby a buffer address may be repeatedly written into corresponding time slots of the dynamic memory so as to provide for automatic processing of an input channel along with input submultiplex channels.

It is an object of the present invention to provide a multiplex data switch which is capable of switching an input channel or submultiplex channel to any output channel or submultiplex channel regardless of the bit rates of the groups with which the channels are associated.

It is another object of the present invention to provide a multiplex data switch which is capable of simultaneously switching both channels and submultiplex channels.

It is a further object of the present invention to provide a multiplex data switch of the type described which is uncomplicated in construction and efficient and dependable in operation, requiring a minimum of storage elements for the data being switched.

These and other features and advantages in the present invention will become apparent from the following detailed description thereof, when taken in conjunction with the accompanying drawings which disclose various embodiments of the present invention, and wherein.

An exemplary data switch arrangement in accordance with the present invention will now be disclosed in order to set forth the basic principles of the present invention, it being understood that various modifications in the format of the information being switched and in the parameters provided by way example may be effected without departing from the spirit and scope of the invention.

Figure 1:
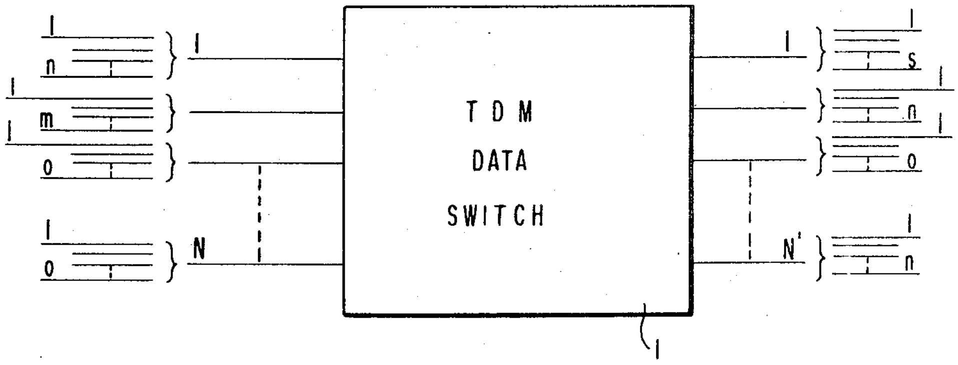
FIG. 1 is a general block diagram indicating the objective of the time division multiplex data switch arrangement in accordance with the present invention.

Looking now more particularly to FIG. 1, the general object of the present invention proposes the switching of any one of a number of communication channels (*m*, *n*, *o*) forming inputs groups 1–N to any one of a number of outgoing communication channels (*n*, *o*, *s*) forming output groups 1–N′. In the Figure a time division multiplex data switch 1 is illustrated as receiving a plurality of groups of channels 1 through N, with each group consisting of a plurality of channels which may vary in number from one group to the next. The input channels may be respectively switched to any one of a number of output groups 1 through N′, each also consisting of a plurality of output channels which again may vary in number from one group to the next. In the overall system $2^n$ channels can be assigned to any specific input or output group, where *n* is any integer from 3 through 8, with the input and output groups to and from the date switch being individually assigned any combination of channel quantities, so long as the total number of channels switched by the data switch arrangement does not exceed the maximum number of bits switchable during the cross office time frame. This requirement will become more apparent as the following description of the invention proceeds.

Figure 2:
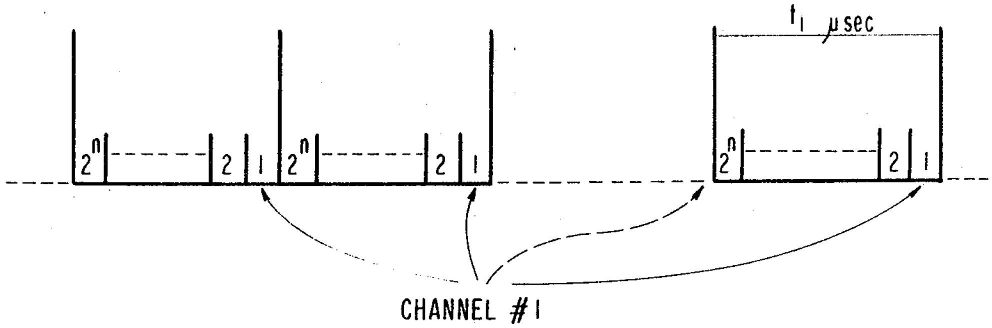
FIG. 2 is a schematic diagram illustrating the bit format for an exemplary data group containing a plurality of channels.

Independent channels assigned to a group are bit multiplexed, as indicated by way of example in FIG. 2. The repetition time for each channel is $t_1$ microseconds; however, as is apparent from the format presented in the figure, the input bit rate or output bit rate of any group depends on the number of channels which are assigned to the group. In the exemplary embodiment of the invention wherein the total number of input channels may be $2^8$ or 512, if the input bit rate per individual channel as fixed by the system is 19.2 kb./s., the group bit rate will be $2^n \times 19.2$ kb./s. and the channel repetition time $t_1$ will be 52 microseconds.

Since any input or output group may consist of a varying number of channels, and since the repetition rate of the individual channels is fixed by the system, the input bit rate to the data switch via any group depends on the number of channels assigned to that group. Thus, a group containing a large number of channels will have a higher bit rate than one having a smaller number of channels. However, in accordance with the present invention, any input channel can be switched to any output channel regardless of the bit rate of the group to which either channel is assigned. This is accomplished, as is explained in detail hereafter, through adjustment of the channels to each output group.

Figure 3:
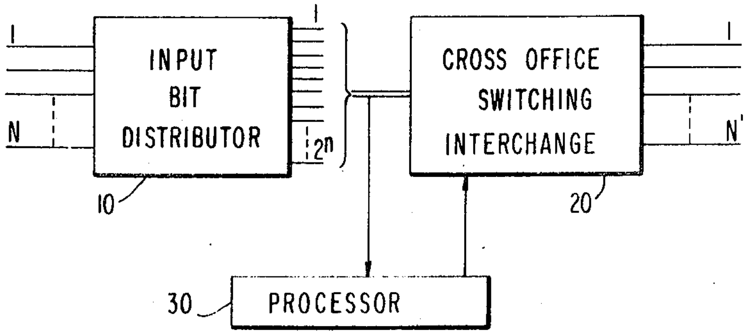
FIG. 3 is a block diagram illustrating the basic components of the data switch arrangement in accordance with the present invention.

As seen in FIG. 3, the input groups 1 through N are applied to an input bit distributor 10 wherein each group is demultiplexed into independent channel bit streams at the channel bit rate of 19.2 kb./s., which as indicated is fixed regardless of the individual bit rate of the group. The input bit distributor provides a plurality of outputs equal to the number of input channels to the distributor, i.e., equal to the number of channel bit streams provided by the demultiplexing operation within the distributor, which in the exemplary embodiment is 512. The individual bits of each channel bit stream are then held in the input bit distributor 10 for the frame time of the cross-office switching operation which is equal to the channel repetition time $t_1$=52 microseconds. In this way all data stored in the single-bit stores will be surely switched before the following data is received.

The cross-office switching interchange 20 provides for connection of each of the outputs of the input bit distributor 10 to respective ones of the output groups 1–N′ in the proper sequence determined by instructions received from a processor 30. The processor 30 receives steering information for directing the individual input channels to particular output channels, for example, via out-of-band signalling information contained in a predetermined channel associated with each group. The channels containing the out-of-band signalling information are connected directly from the output of the input bit distributor 10 to the processor 30 for processing and application to the cross-office switching interchange 20.

The manner in which input channels are selectively switched by the switching interchange 20 to desired output channels under control of the processor 30 will now be described in greater detail in connection with the more detailed schematic block diagram of FIG. 4. Data is received on each group input to the date switch arrangement in the form illustrated in FIG. 2 and is applied to individual bit distributors 12 within the distributor arrangement 10. Each bit distributor 12 cyclically scans the incoming information and steers each bit to an assigned individual single-bit store in a group of stores 14. The single-bit stores are provided on a per channel basis, so that the total number of stores equals the total number of input channels and each single-bit store is dedicated to a specific input channel.

One particular single-bit store associated with each input group may be dedicated to out-of-band signalling channels providing steering information which is connected directly to the central processor 30. It is via this means that the processor assimilates the information associated with an input channel to determine its cross-office routing. The input channel to output channel cross-office assignment or routing is transferred from the processor to the dynamic memory 24 in the cross-office switching interchange 20 where the input channel identity is recorded as a unique number which identifies the single-bit store assigned to that channel. The relative time position at which the unique number recirculates in the dynamic memory is then used to specify the assigned output channel and group identity to which the information from the particular input channel is to be switched.

The single bit buffer stores in the input bit distributor 10 store each bit for up to $t_1$=52 microseconds awaiting cross office switching. Information is switched across the office via a single time division highway in the cross-office switching interchange 20 with the cross-office time division multiplex frame time being equal to the storage time of the input single-bit buffer stores, i.e., 52 microseconds. In this way, the cross-office time division multiplex switching frame may be divided into a plurality of time slots equal to the number of single-bit stores and each output channel from the data switch arrangement may be assigned one of the discreet time slots in the cross-office time division multiplex switching frame.

By dedicating the output channel to time slot assignment in the cross-office time division multiplex switching frame, it is possible to minimize the output buffer requirements to a single-bit buffer per output group. To accomplish bit rate changes, possibly required in intergroup switching, the output channel to time slot assignment is provided as a function of the output group to which the independent channels are dedicated. Although the independent output channel bit repetition rate is a fixed value, the output channel bit stream must be bit multiplexed into the assigned output group at a rate determined by the number of input channels times the individual channel repetition rate. Time slots assigned to channels within a given group are interlaced into the cross-office time division multiplex frame such that adjacent channels will occur at prescribed intervals in dedicated time slots of the switching frame.

Figure 5:
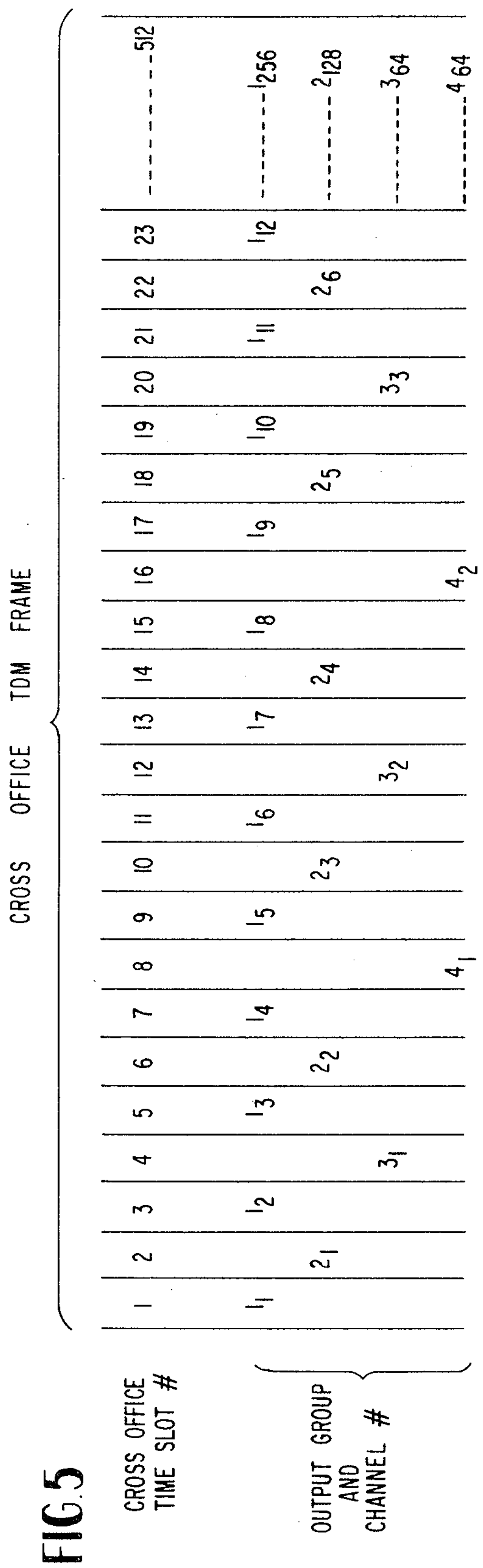
FIG. 5 is a chart illustrating the cross-office time slot/output trunk group and channel assignment which may be used in accordance with the present invention.

FIG. 5 provides, as one example, a chart indicating a typical output channel to time slot assignment for a switching arrangement wherein $2^8$ or 512 output channels are assigned to four output groups. It can be seen from the Figure that the total number of output channels equals the total number of cross-office time slots in the switching frame, which in turn equals the number of input channels to the switching arrangement; however, the number of output channels assigned to each output group may vary in number. In the illustrated examples, output group number 1 is provided with 256 output channels, output group number 2 is provided with 128 output channels, and output groups 3 and 4 are provided each with 64 output channels. Thus, the bit rate of the various output groups will be different, and may therefore be different from the bit rate of the input groups to which they are connected by the switching arrangement.

Turning once again to FIG. 4, it is seen that provision of a dynamic memory 24 having a delay time providing for 512 time slots in the cross-office switching frame may be utilized to selectively connect respective input signal bit stores to the time division multiplex highway in a prescribed order as determined by data received from the central processor 30 by using a particular time slot to control the switching of an input single-bit store to the highway. The interconnection of the single-bit stores with the time division multiplex highway under control of the dynamic memory is provided by a matrix 22 to which the outputs of the single-bit stores 14 are connected. Since each time slot of the cross-office switching frame is dedicated to a particular output channel forming part of a particular output group, for example in accordance with the assignment schedule of FIG. 5, by storing the address of the single-bit store dedicated to a particular input channel in a time slot dedicated to the output channel to which the particular input channel is to be switched, a connection of the data in the single-bit store in question to the time division multiplex highway will be effected automatically at the prescribed time to produce a transfer of this information to the required output group and proper output channel thereof.

A distributor circuit consisting of gates 26 in the cross-office switching interchange 20 steers the time slot dedicated to a specific output group in accordance with the assignment schedule from the time division multiplex highway output to an appropriate single-bit store assigned to that output group in the output buffer 28.

Figure 4:
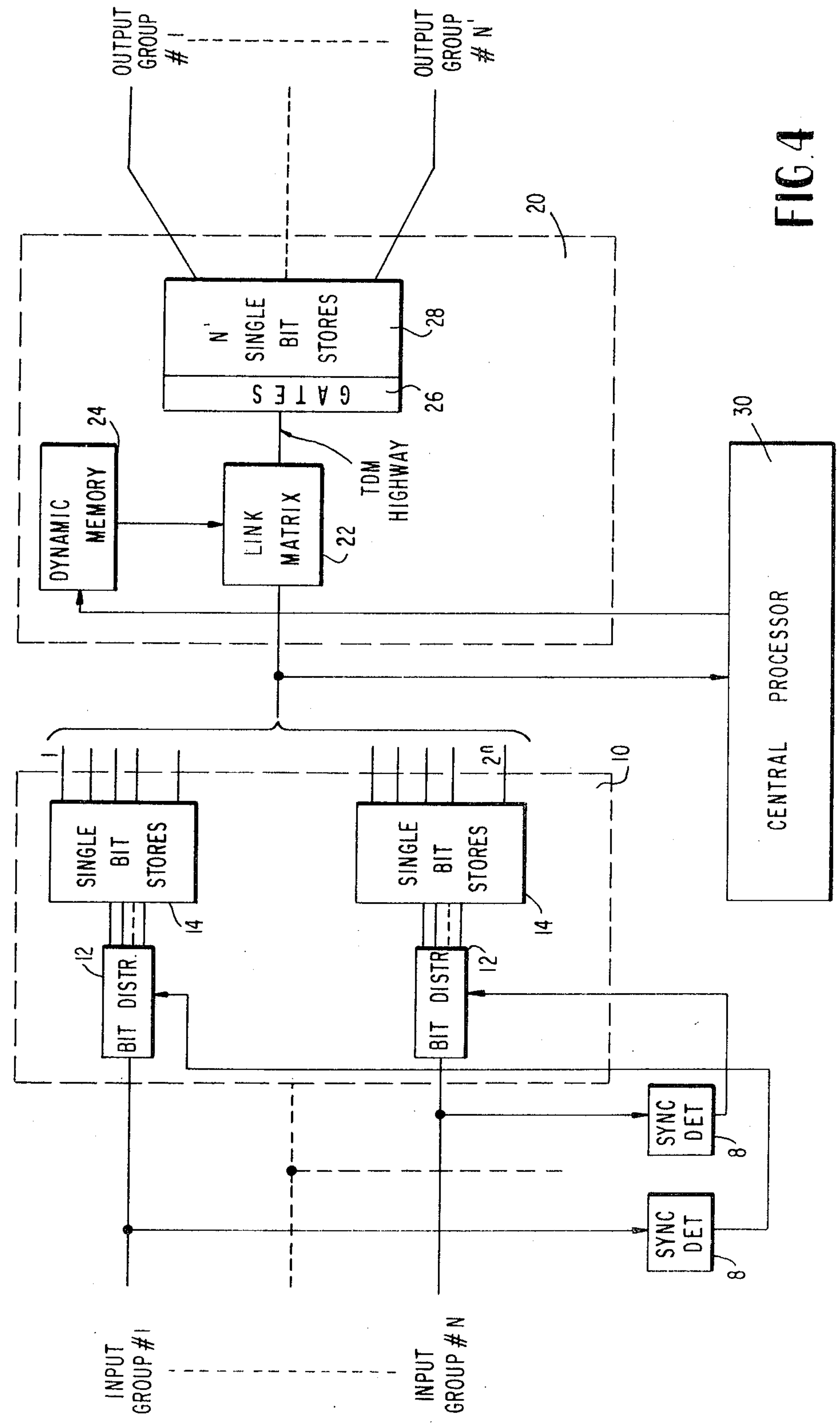
FIG. 4 is a more detailed schematic block diagram of the present invention.

As noted from FIG. 4, all inputs to the system are continuously routed to independent group sync detectors 8 which continuously monitor all incoming information to establish a reference point for bit to channel synchronization. In order to ensure continued synchronization of this system, the processor is capable of resynchronizing the input bit distributors in the event that an out-of-sync condition prevails. This is accomplished under command from the processor by controlling the input bit distributors to slip the incoming information by a period equivalent to a single bit time. In this way the sync signal information could be detected and synchronous operation reestablished.

The data switch arrangement in accordance with the present invention is also applicable to the switching of data wherein the input and output channels are submultiplexed in some or all of the input and output groups. For handling data in this form, the previously described circuit arrangement of FIG. 4 need only be altered by increasing the number of single-bit stores in each group 14 to a total equal to the total number of possible submultiplex channels at the input to the switch. In addition, the dynamic memory 24 is provided with a delay time corresponding to the total time of the cross-office switching frame so as to include a time slot for each of the single-bit stores.

Figure 6:
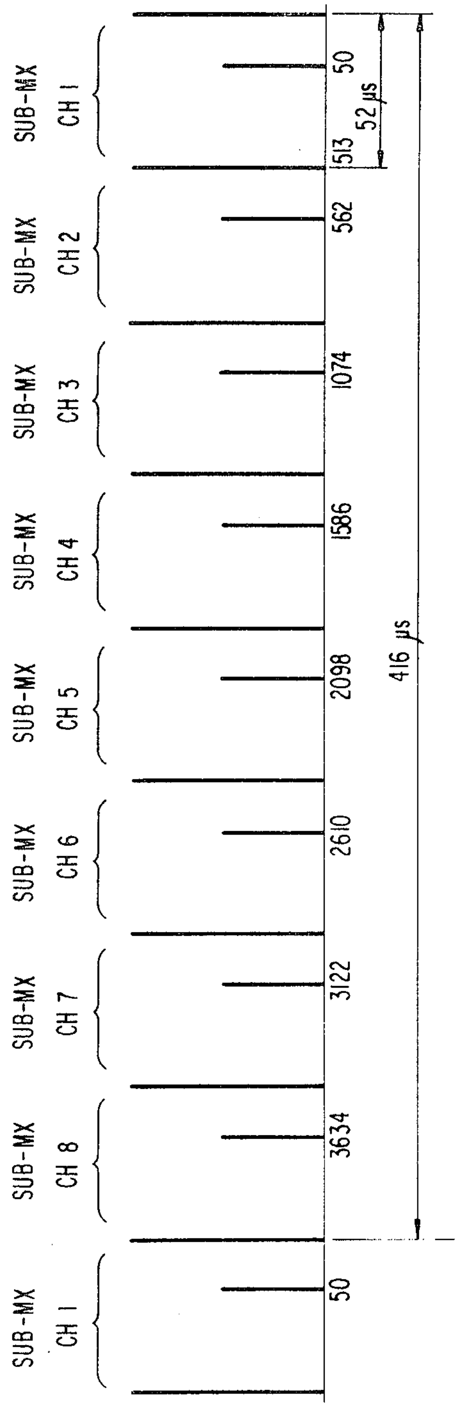
FIG. 6 is a schematic diagram illustrating the bit format in a submultiplex arrangement in accordance with the present invention.

FIG. 6 illustrates the data format of a typical input group containing eight submultiplex channels, wherein each submultiplex channel has a duration of 52 microseconds and includes 512 channels having a repetition rate of 416 microseconds. The data arrangement illustrated in this figure provides an indication of the data format of the dynamic memory 24. If each 52 microsecond period contains 512 time slots with a total delay of 416 microseconds, the dynamic memory will contain 4,096 time slots for controlling an equal number of input single-bit stores.

With each channel submultiplexed into eight submultiplex channels, the respective time slots in each 52 microsecond period are sequentially assigned to submultiplex channels 1–8. For example, if it is assumed that within a 52 microsecond period time slot number 50 is dedicated to a submultiplex output channel, the individual submultiplexed channels within the output channel would be assigned the following time positions in the dynamic memory:

| Submultiplexed channel number | Time position number | Time slot identity of assigned channel |
|---|---|---|
| 1 | 50 | 50 |
| 2 | 562 | 50 |
| 3 | 1074 | 50 |
| 4 | 1586 | 50 |
| 5 | 2098 | 50 |
| 6 | 2610 | 50 |
| 7 | 3122 | 50 |
| 8 | 3634 | 50 |

Switching of submultiplex channels is thus made once every 416 microseconds. In this case, the single-bit stores dedicated to incoming submultiplex channels must store information for up to 416 microseconds, which is equal to the cross-office switching time frame.

The operation of the system accommodating submultiplex channels is similar to that described above in connection with system of FIG. 4. If the input groups provide information consisting of a plurality of channels submultiplexed into, for example, eight submultiplex channels, the bit distributors 12 will demultiplex the data into independent submultiplex channel bit streams which will be steered to a single-bit buffer assigned to the individual submultiplex channel. The dynamic memory 24 containing 4,096 time slots corresponding to the total number of submultiplex channels will then be programmed from the central processor 30 to dedicate a particular output submultiplex channel of a designated output group to each of the time slots of the cross-office switching frame so that the insertion of the address of a particular single-bit store associated with a submultiplex channel will result in the timely switching of the information in this single-bit store to the desired submultiplex channel in the output of the data switch arrangement.

A further advantage of the data switch arrangement in accordance with the present invention is that under control of the central processor 30, a combination of channels and submultiplex channels at the input of the data switch arrangement may be effectively switched to any combination of output channels and submultiplex channels in the output of the data switch arrangement. In other words, the data switch arrangement may be utilized to switch a submultiplex input channel to any output channel or output submultiplex channel regardless of the bit rate of the groups involved. In addition, the switching arrangement in accordance with the present invention may also be utilized without modification to switch a nonsubmultiplex channel, i.e., a channel having a repetition rate of 52 microseconds rather than 416 microseconds, to any output channel or output submultiplex channel without regard to the bit rate of the groups involved. This may be effected by means of the control arrangement illustrated in FIG. 7.

Figure 7:
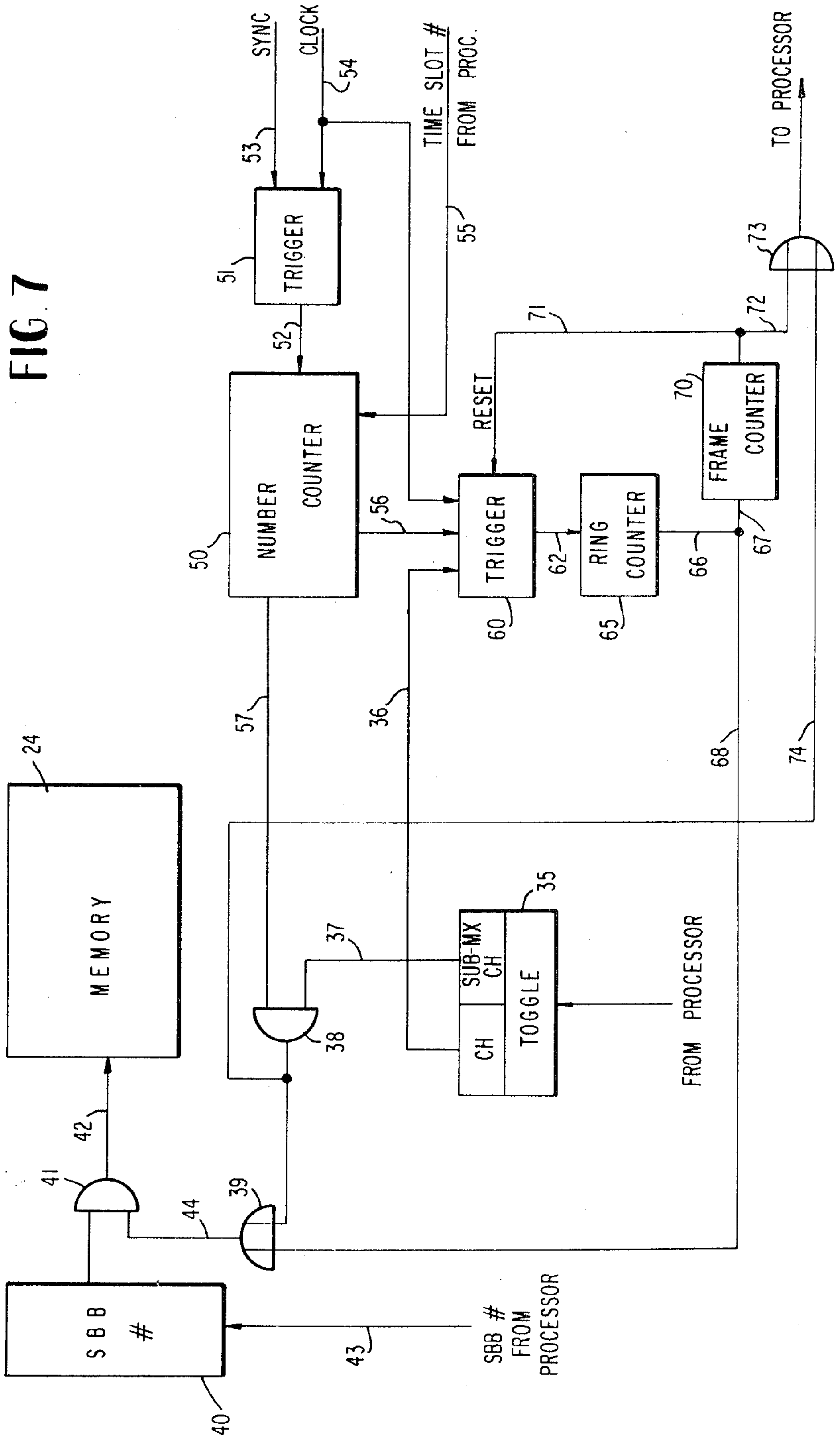
FIG. 7 is a schematic block diagram of a portion of the central processor providing control over the application of instruction to the dynamic memory.

In the system illustrated in FIG. 7 toggle circuit 35 actuated from the information in the processor derived from out-of-band signalling information is set to indicate whether the forthcoming connection information relates to nonsubmultiplexed channels or submultiplexed channels, the appropriate enabling signal being supplied in the respective cases on output lines 36 and 37 thereof. The output line 37 from the toggle circuit 35 is applied to an AND-gate circuit 38, which is in turn connected to one lead of an OR-gate 39 providing a control signal along line 44 to a control AND-gate 41, selectively controlling the application of address information to the memory from a single-bit buffer register 40.

The system also includes a counter 50 which may be in the form of a 512 position ring counter settable to a prescribed number corresponding to the time slot into which data is to be inserted and providing an output control signal upon being driven to zero by applied clock pulses via a trigger circuit 51 on line 52. The output control signal from the counter 50 is applied via line 56 to a trigger circuit 60 which drives a subframe ring counter 65 connected on the one hand to a frame counter 70 and on the other hand to an input of the OR-gate 39.

The control system of FIG. 7 operates to control the storage of single-bit buffer numbers in the assigned output channel time slots of the memory in the following manner. To switch a nonsubmultiplexed system using the dynamic memory of the submultiplexed system containing 4,096 time slots, it is necessary to repeatedly store the single-bit buffer number of the nonsubmultiplexed channel in the assigned output channel time slot for all 52 microsecond periods. Since the single-bit buffer in this instance will store information for only 52 microseconds, it will be seen that the cross-office time division multiplex transfer for the nonsubmultiplexed channel will be made every 52 microseconds.

Control signals are initiated by the central processor from data received from the out-of-band signalling information. The processor sets the toggle circuit 35 to provide a control output on either line 36 or line 37 depending upon whether the forthcoming connection information relates to a nonsubmultiplexed channel or to a submultiplexed channel. In the case of a nonsubmultiplexed channel the control signal is applied to line 36 to the trigger circuit 60. At the same time, the single-bit buffer number identifying the input channel is transferred from the processor to the static register 40 and the time slot number (1–512) identifying the output channel is transferred to the counter 50. When the memory sync pulse is received on line 53 to the trigger circuit 51, the trigger circuit is set thereby applying clock pulses from a source (not shown) via line 54 to line 52 at the input of the counter 50. The counter is thereby driven down to zero by the applied clock pulses.

Since the counter was originally set to the value of the time slot number of the associated output channel, upon reaching a count of zero the time slot of the time frame assigned to the output channel will be marked by an output signal from the counter on line 56. With the receipt of a control signal on line 56 from the counter 50 and on line 36 from the toggle circuit 35, the trigger 60 will be actuated to apply clock pulses from line 54 via line 62 to a 512 position ring counter 65. The ring counter successively counts 512 positions at the clock rate and each time, after 512 counts, the time slot signal of the assigned output channel is generated on line 66 where it is applied via line 68, OR-gate 39 and lines 44 to the input of the control AND-gate 41 to gate the single-bit buffer number from the static register 40 into the dynamic memory. After each 512 time slots generated by the ring counter 65, the counter also increments a seven position frame counter 70 via line 67. When the frame counter 70 is advanced to a count of 7, the trigger output therefrom is applied along line 71 to reset the trigger circuit 60 and along line 72 to OR-gate 73 indicating completion of the operation to the processor. In this way, the single-bit buffer number identifying the input channel is stored in the output channel time slot of the memory in all eight submultiplexed channels as desired.

In the case where the connection information relates to a submultiplex channel, the single-bit buffer number identifying the input multiplexed channel is transferred to the static register 40 in the manner described above and the time slot number (1–4096) identifying the output submultiplex channel is transferred counter 50. The toggle circuit is then actuated from the processor to provide a control output signal on line 37 to the AND-gate 38. Once again, upon detection of the memory sync pulse along line 53 to the trigger 51, the trigger is actuated applying clock pulses from line 54 via line 52 to the counter 50. The counter 50 is driven down to zero by the clock pulses, and when reaching the zero state provides a control output on line 56 to the trigger circuit 60. However, in this case since the trigger is not actuated via a control pulse from the line 36 at the output of the toggle circuit 35, the trigger 60 will not respond to the applied control pulse from the counter 50.

The time slot pulse generated by the counter 50 is also applied via line 57 to the AND-gate 38 which is enabled by the output of the toggle circuit 35 along line 37. The time slot pulse then passes through the AND-gate 38, the OR-gate 39, along line 44 to actuate the control AND-gate 41 gating the single-bit buffer number into the memory. The output from the AND-gate 38 is also applied via line 74 to the OR-gate 73 which signals the processor that the operation is completed.

In this way, the single-bit buffer numbers may be inserted into the dynamic memory either to provide for the switching of an input nonsubmultiplex channel or to provide for switching of a submultiplex channel to any output channel or submultiplex channel regardless of the bit rate of the groups involved. This also permits the application to the data switch arrangement of both channels and submultiplex channels which may be simultaneously switched to output channels or submultiplex channels in an automatic manner without an alteration or reconstruction of the circuitry.

We have shown and described several embodiments in accordance with the present invention. It is understood that the same is not limited thereto but is susceptible of numerous changes and modifications as known to a person skilled in the art and we, therefore, do not wish to be limited to the details shown and described herein, but intend to cover all such changes and modifications as are obvious to one of ordinary skill in the art.

We claim:

1. A time division multiplex data switch for switching any one input channel included in one of a plurality of groups of multiplexed input channels to any one of a plurality of groups of multiplexed output channels comprising input bit distributor means for demultiplexing said groups of input channels and first single-bit storage means including a plurality of single-bit stores for individually storing the bits of the input channels of respective groups in different stores for a time equal to the repetition rate of said multiplexed input channels, cross-office switching means connected to said single-bit storage means for selectively gating the bits individually stored therein to respective groups of output channels in timed sequence to produce said groups of multiplexed output channels, including a single-multiplex highway and matrix means connected to the outputs of said single-bit stores for sequentially connecting said stores to said highway in a selectively controlled order, processor means responsive to a switching instruction for controlling the sequence of the stored bits switched by said cross-office switching means to said multiplex highway so as to connect a given input channel to a given output channel, including a dynamic memory providing a time slot for each output channel connected in control of said matrix means and control means for storing said switching instruction in said memory, and second single-bit storage means including one single-bit store for each group of output channels and gating means for connecting said multiplex highway to the single-bit stores of said second single-bit storage means in the order in which the time slots of said memory are assigned to said output channels.

2. A time division multiplex date switch as defined in claim 1 wherein the number of input channels in at least one group of input channels and the number of output channels in at least one group of output channels differs from the number in the other respective groups.

3. A time division multiplex data switch as defined in claim 1 wherein the time slot assignment of output channels in said memory provides for an interlacing of data to said multiplex highway in accordance with the number of output channels assigned to each group.

4. A time division multiplex data switch as defined in claim 1 wherein each input channel is divided into a plurality of input submultiplex channels and each output channel is divided into a plurality of output submultiplex channels, a first single-bit store being provided for each input submultiplex channel and each time slot in said memory being formed of a plurality of subslots each assigned to an output submultiplex channel.

5. A time division multiplex data switch as defined in claim 4 wherein said instruction means includes first register means for storing a unique signal representative of a first single-bit store and timing means for gating said unique signal into said memory at the proper time to store said signal in a certain subslot thereof.

6. A time division multiplex data switch as defined in claim 5 wherein said timing means includes a first counter, means for storing in said first counter the number of the subslot in said memory to which a unique signal is to be transferred, a source of clock pulses, trigger means for applying said clock pulses to said first counter to drive said counter to zero in synchronism with the start of the cycle of said memory, said first counter providing a transfer signal upon reaching the count of zero, and a first gate connecting said first register means to said memory upon receipt of said transfer signal.

7. A time division multiplex data switch as defined in claim 6 wherein said timing means further includes additional means for successively gating said unique signal from said first register means into said memory in the corresponding subslot of consecutive submultiplex channels.

8. A time division multiplex data switch as defined in claim 7 wherein said additional means includes a second counter producing a transfer signal upon reaching a count equal to the number of time slots allocated to a submultiplex channel, and second trigger means for selectively applying clock pulses from said source to said second counter, said transfer pulse being applied to said first gate to connect said first register means to said memory.

9. A time division multiplex data switch as defined in claim 8 wherein said timing means further includes a second gate connected to said first gate for applying either the transfer signal from said first counter or from said second counter to actuate said first gate.

10. A time division multiplex data switch as defined in claim 8 wherein said additional means further includes a frame counter connected to said second counter for counting said transfer signals and providing a reset signal upon reaching a count equal to the number of submultiplex channels, said reset signal serving to reset said second trigger means.

11. A time division multiplex data switch as defined in claim 10 wherein said timing means further includes a toggle circuit for selectively disabling said trigger means or blocking the transfer signal from said first counter to effect control over data relating to a submultiplex channel or a channel, respectively.

12. A time division multiplex data switch as defined in claim 1 wherein synchronous detector means are connected from each input group to each bit distributor for ensuring synchronous operation thereof.

* * * * *

UNITED STATES PATENT OFFICE
CERTIFICATE OF CORRECTION

Patent No. 3,639,693 Dated February 1, 1972

Inventor(s) William F. Bartlett, William A. Oswald

It is certified that error appears in the above-identified patent and that said Letters Patent are hereby corrected as shown below:

Column 2, line 61 "inputs" should read --input--; line 74, "date" should read --data--; Column 3, line 63, "date" should read --data--; Column 10, line 8, "said trigger means" should read --said second trigger means--.

Signed and sealed this 18th day of February 1975.

(SEAL)
Attest:

RUTH C. MASON
Attesting Officer

C. MARSHALL DANN
Commissioner of Patents
and Trademarks